United States Patent [19]

Dawson, III et al.

[11] Patent Number: 6,154,836
[45] Date of Patent: Nov. 28, 2000

[54] METHOD AND SYSTEM FOR CONFIGURING PLUG AND PLAY DEVICES FOR A COMPUTER OPERATING SYSTEM

[75] Inventors: Marshall Allen Dawson, III, Longmont, Colo.; John Matthew Landry, Wake Forest, N.C.

[73] Assignee: International Business Machines Corporation, Armonk, N.Y.

[21] Appl. No.: 09/135,119

[22] Filed: Aug. 17, 1998

[51] Int. Cl.[7] ................................................. G06F 9/445
[52] U.S. Cl. ................................................................ 713/1
[58] Field of Search .................................. 713/1, 2, 100; 710/8–10

[56] References Cited

U.S. PATENT DOCUMENTS

| | | | |
|---|---|---|---|
| 5,634,075 | 5/1997 | Smith et al. | 710/9 |
| 5,655,148 | 8/1997 | Richman et al. | 710/8 |
| 5,748,980 | 5/1998 | Lipe et al. | 710/8 |
| 5,822,582 | 10/1998 | Doragh et al. | 713/2 |
| 5,999,989 | 12/1999 | Patel | 710/1 |

*Primary Examiner*—Thomas M. Heckler
*Attorney, Agent, or Firm*—Anthony N. Magistrale; Felsman, Bradley, Vaden, Gunter & Dillon, LLP

[57] ABSTRACT

A method and system are disclosed for configuring PnP devices for a computer operating system by initiating a power on self test (POST) within a computer system for configuring PnP and PCI devices. During the process of configuring PnP and PCI devices, a list is composed of devices that are not absolutely necessary for booting the system (e.g. modem or ethernet controller). While the PCI devices are configured, if the system has no usable IRQ's, POST takes one from a nonessential PnP ISA (Industry Standard Architecture) device in the list, and gives it to the PCI device. The POST operation searches for the presence of a PnP operating system option while progressing through the startup sequence (of bootable media), and activates or deactivates all devices, depending on the type of media being attempted. If the medium is the hard disk (where the PnP operating system option resides), all of the PnP devices in the list are deactivated. If the medium is any other type (where a PnP operating system option is not likely to reside) the devices are activated.

20 Claims, 6 Drawing Sheets

METHOD AND SYSTEM FOR CONFIGURING PLUG AND PLAY DEVICES FOR A COMPUTER OPERATING SYSTEM

BACKGROUND OF THE INVENTION

1. Technical Field

The present invention relates in general to the field of information processing systems. In particular, the present invention relates to a method and system for a plug and play (PnP) operating system that dynamically configures, activates and deactivates PnP devices. More particularly, the present invention relates to a plug and play (PnP) operating system that may dynamically modify the configuration of PnP devices. Still more particularly, the present invention relates to a method and system that provides all peripheral component interconnect devices (PCI) within a computer system to have interrupts assigned.

2. Description of the Related Art

Computer systems, such as personal computers, are increasingly being designed and constructed full-featured, with many types of peripheral devices integrated with such computers systems. Peripheral devices, such as mouse, modem, audio, video, memory and input/output ports are now standard within such computer systems. As a result of having so many peripheral devices integrated within computer systems, system resources, such as direct memory access (DMA) channels, memory, input/output ports, and hardware interrupt request (IRQ) signals, are becoming increasingly constrained, which diminishes or eliminates altogether the possibility of expanding the computer system.

One technique which attempts to manage system resources includes the so-called "Plug and Play" protocols which are composed of a set of specifications that allows a computer system to configure itself automatically to work with peripherals such as monitors, modems, printers, and so forth. The ISA (Industry Standard Architecture) Plug and Play specification allows devices to outline dependencies in resources, as well as sub-optimal configurations. A user can "plug" in a peripheral and "play" it without manually configuring the system. Plug and Play requires both a BIOS that supports Plug and Play, and a Plug and Play device, which can either be located on a system board or in an expansion slot. (BIOS is an acronym for "Basic Input/Output System." On personal computer compatible computers, BIOS is composed of the set of essential software routines that test hardware at start-up, start the operating system, and support the transfer of data among hardware devices. The BIOS is stored in read-only memory (ROM), so that it can be executed when power is applied to the computer. Although critical to performance, the BIOS is usually "invisible" to computer users.)

Today's personal computer operating systems (OS's) are more capable of configuring Plug and Play (PnP) devices than utilizing a system Power-On Self Test (POST) within the BIOS. A disadvantage of using POST within the Basic Input/Output System (BIOS) is that is constrained on executable program space wherein the majority of the POST runs within a 64 KB segment. Architecturally, this could be expanded, but the hardware requirements are not commercially feasible in today's computer market. Comparatively, the operating system has limitless room for its configuration software and dynamic data structures. Therefore, some operating systems have a plug and play (PnP) feature which allows the operating system to dynamically configure, activate (i.e. turn on) and deactivate PnP devices, as well as dynamically modify the configuration of these devices. However, for compatibility reasons, the operating system should only dynamically change a device's configuration if the operating system was initially responsible for activating the device. Therefore, if POST configures a device, the operating system will not have the flexibility to change the configuration later.

BIOS vendors, at the suggestion of the Microsoft Corporation, have implemented an option (accessible through the BIOS Setup Utility) to control whether POST configures PnP devices (hereafter referred to as a PnP operating system option). When the PnP operating system option is turned on, POST assumes that a PnP operating system is present on the system and will avoid activating PnP devices. When the PnP operating system option is not turned on, POST controls the configuration of all PnP devices in the system, typically configuring and activating all devices it can. Therefore, it would be desirable to check for the presence of a PnP operating system option on a hard disk and have the PnP operating system option when turned on, configure and activate the PnP devices when POST turns control over to the operating system and the PnP devices are turned off. Additionally, if the boot device happens to be a diskette, CD-ROM, etc. where configuration software is not present, the end user has no way of configuring and activating the devices, for example a CD-ROM containing diagnostic programs. If the devices are turned off, they can't be tested. Therefore it would be desirable to not require an end user to manually turn off the PnP operating system option, perform the desired task, and turn the option back on. Lastly, the method and system of the present invention makes every effort to assign an interrupt request signal (IRQ) to Peripheral Component Interconnect (PCI) devices. Currently, PnP operating systems are not capable of assigning IRQ signals to PCI devices, so the BIOS is required to make the assignment before handing control to the operating system.

SUMMARY OF THE INVENTION

It is an object of the present invention to provide an improved information processing system.

It is another object of the present invention to provide an improved method and system for a plug and play (PnP) operating system that dynamically configures, activates and deactivates PnP devices.

It is yet another object of the present invention to provide an improved method and system for a plug and play (PnP) operating system that may dynamically modify the configuration of PnP devices allocated in an efficient manner in order to enhance system performance.

It is still another object of the present invention to provide an improved method system for a plug and play (PnP) operating system that provides all peripheral component interconnect devices (PCI) within a computer system to have interrupts assigned.

The above and other objects are achieved as is now described. A method and system are disclosed for configuring PnP devices for a computer operating system by initiating a power on self test (POST) within a computer system for configuring PnP and PCI devices. During the process of configuring PnP and PCI devices, a list is composed of devices that are not absolutely necessary for booting the system (e.g. modem or ethernet controller). While the PCI devices are configured, if the system has no usable IRQ's, POST takes one from a nonessential PnP ISA (Industry Standard Architecture) device in the list, and gives it to the PCI device. The POST operation searches for the presence of a PnP operating system option while progressing through the startup sequence (of bootable media), and activates or deactivates all devices, depending on the type of media being attempted. If the medium is the hard disk (where the PnP operating system option resides), all of the PnP devices in the list are deactivated. If the medium is any other type (where a PnP operating system option is not likely to reside) the devices are activated.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of a preferred embodiment when read in conjunction with the accompanying drawings, wherein:

DETAILED DESCRIPTION OF PREFERRED EMBODIMENT

Figure 1:
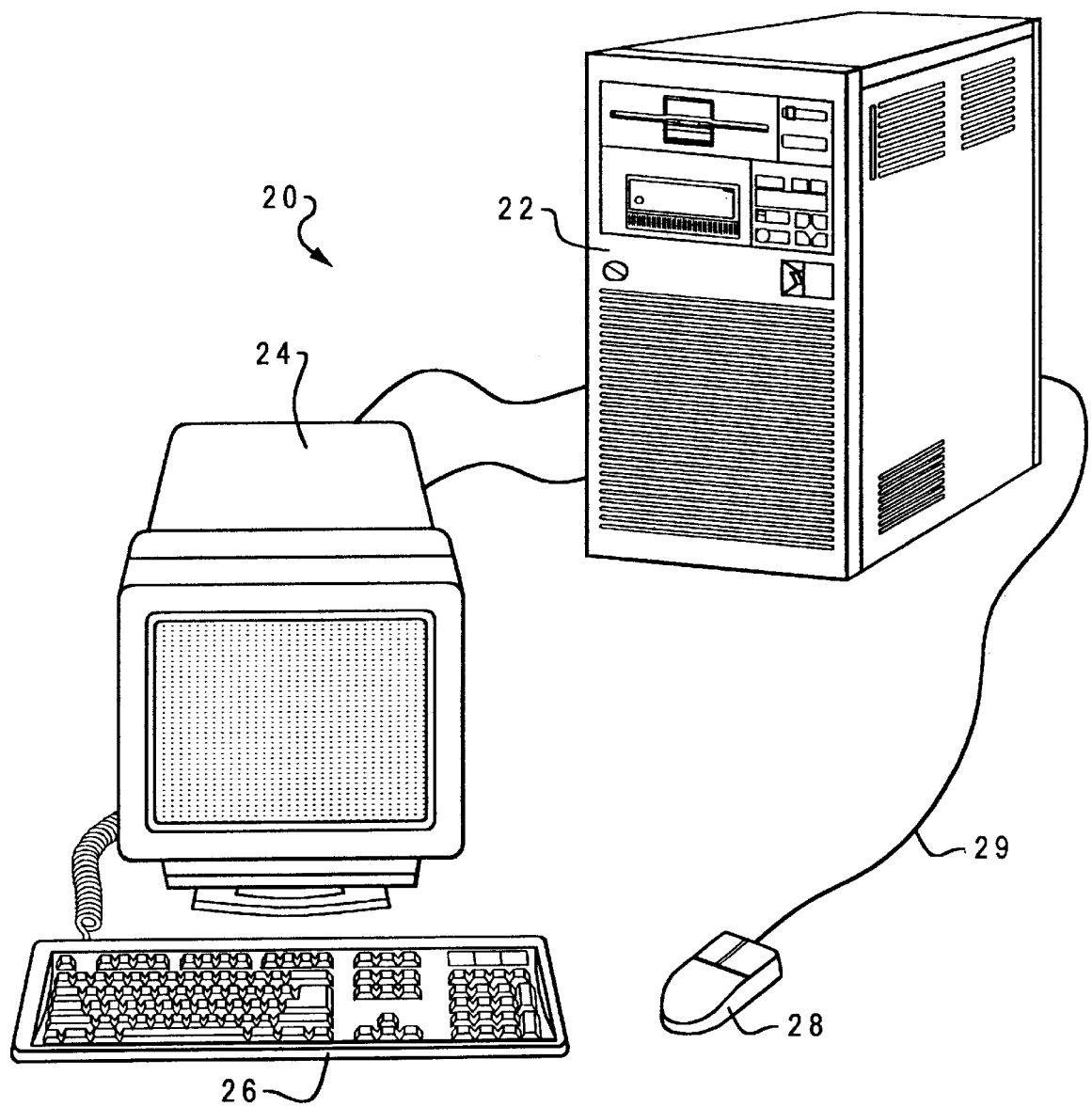
FIG. 1 illustrates a pictorial representation of a computer system which may be utilized to implement a preferred embodiment of the present invention.

With reference now to the figures and in particular with reference to FIG. 1, there is depicted a pictorial representation of a computer system which may be utilized to implement a preferred embodiment of the present invention. A computer system 20 is depicted that includes a system unit 22, a video display terminal 24, a keyboard 26, and a mouse 28. A cable 29 connects mouse 28 to system unit 22. Keyboard 26 is that part of computer system 20 that resembles a typewriter keyboard and which enables a user to control particular aspects of the computer. Because information flows in one direction, from keyboard 26 to system unit 22, keyboard 26 functions as an input-only device. Functionally, keyboard 26 represents half of a complete input/output device, the output half being video display terminal 24. Keyboard 26 includes a standard set of printable characters presented in a QWERTY pattern typical of most typewriters. In addition, keyboard 26 includes a calculator-like numeric keypad at one side. Some of these keys, such as the "control," "alt," and "shift" keys can be utilized to change the meaning of another key. Other special keys and combinations of keys can be utilized to control program operations or to move either text or cursor on the display screen of video display terminal 24.

Figure 2:
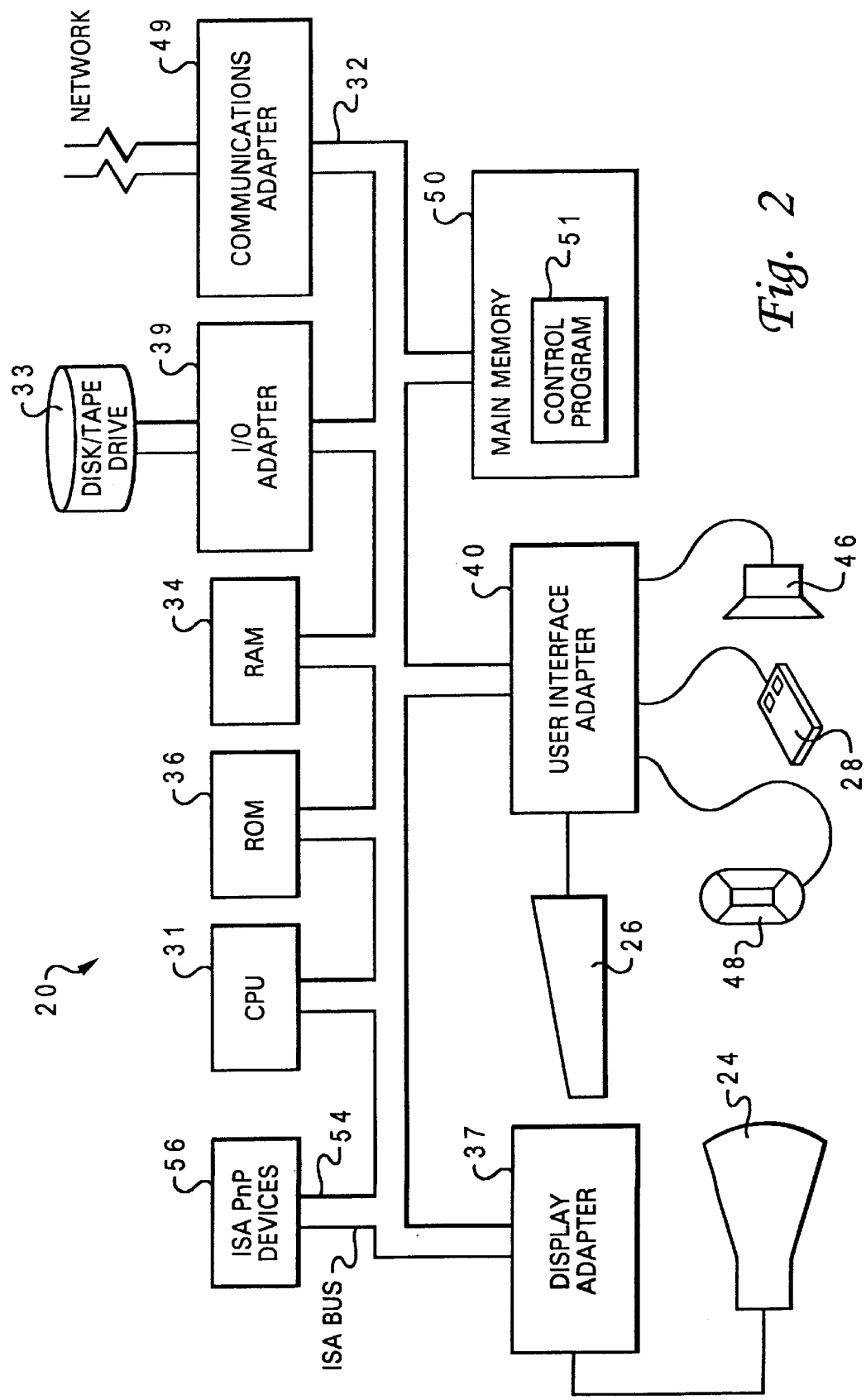
FIG. 2 depicts a representative hardware environment of the computer system illustrated in FIG. 1.

Computer system 20 can be implemented utilizing any suitable computer such as the IBM Aptiva™ computer system, a product of International Business Machines Corporation (IBM), located in Armonk, N.Y. However, those skilled in the art will appreciate that a preferred embodiment of the present invention can apply to any computer system, regardless of whether the computer system is a complicated multi-user computing apparatus or a single-user workstation or a network computer. In FIG. 1 and FIG. 2, like parts are identified by like numbers. Computer system 20 is thus a configuration that includes all functional components of a computer and its associated hardware. In general, a typical computer system includes a console or system unit such as system unit 22, with one or more disk drives, a monitor such as video display terminal 24, and a keyboard such as keyboard 26. Additional hardware, often referred to in the art as peripheral devices, can include devices such as printers, modems, and joysticks.

FIG. 2 depicts a representative hardware environment of the computer system illustrated in FIG. 1. Computer system 20 includes a Central Processing Unit ("CPU") 31, such as a conventional microprocessor, and a number of other units interconnected via system bus 32. CPU 31 includes a portion of computer system 20 that controls the operation of the entire computer system, including executing the arithmetical and logical functions contained in a particular computer program. Although not depicted in FIG. 2, CPUs such as CPU 31 typically include a control unit that organizes data and program storage in a computer memory and transfers the data and other information between the various parts of the computer system. Such CPUs also generally include an arithmetic unit that executes the arithmetical and logical operations, such as addition, comparison, multiplications and so forth. Such components and units of computer system 20 can be implemented in a system unit such as system unit 22 of FIG. 1.

Computer system 20 further includes random-access memory (RAM) 34, read-only memory (ROM) 36, display adapter 37 for connecting system bus 32 to video display terminal 24, and I/O adapter 39 for connecting peripheral devices (e.g., disk and tape drives 33) to system bus 32. RAM 34 is a type of memory designed such that the location of data stored in it is independent of the content. Also, any location in RAM 34 can be accessed directly without having to work through from the beginning. ROM 36 is a type of memory that retains information permanently and in which the stored information cannot be altered by a program or normal operation of a computer.

Video display terminal 24 is the visual output of computer system 20. Video display terminal 24 can be a cathode-ray tube (CRT) based video display well-known in the art of computer hardware. However, with a portable or notebook-based computer, video display terminal 24 can be replaced with a liquid crystal display (LCD) based or gas plasma-based flat-panel display. Computer system 20 further includes user interface adapter 40 for connecting keyboard 26, mouse 28, speaker 46, microphone 48, and/or other user interface devices, such as a touch-screen device (not shown), to system bus 32. Speaker 46 is one type of audio device that may be utilized in association with the method and system provided herein to assist diagnosticians or computer users in analyzing computer system 20 for system failures, errors, and discrepancies. Communications adapter 49 connects computer system 20 to computer network. Although computer system 20 is shown to contain only a single CPU and a single system bus, it should be understood that the present invention applies equally to computer systems that have multiple CPUs and to computer systems that have multiple buses that each perform different functions in different ways.

Computer system 20 also includes an interface that resides within a machine-readable media to direct the operation of computer system 20. Any suitable machine-readable media may retain the interface, such as RAM 34, ROM 36, a magnetic diskette, magnetic tape, or optical disk (the last three being located in disk and tape drives 33). Any suitable operating system and associated interface (e.g., Microsoft Windows) may direct CPU 31. For example, the AIX operating system and AIX windows windowing system can direct CPU 31. The AIX operating system is IBM's implementation of the UNIX™ operating system. "UNIX" is a trademark of UNIX Systems Laboratories, Inc. Other technologies also can be utilized in conjunction with CPU 31, such as touch-screen technology or human voice control.

Operating systems typically include computer software for controlling the allocation and usage of hardware resources such as memory, CPU time, disk space, and peripheral devices. The operating system is the foundation upon which applications, such as word-processing, spreadsheet, and web browser programs are built. Although not specifically depicted in computer system 20, expansion slots may also be included for adding adapters and devices such as video controllers as described herein. In addition, Computer system 20 includes an ISA bus 54 linked to generic Plug and Play devices 56.

Those skilled in the art will appreciate that the hardware depicted in FIG. 2 may vary for specific applications. For example, other peripheral devices such as optical disk media, audio adapters, or chip programming devices, such as PAL or EPROM programming devices well-known in the art of computer hardware and the like, may be utilized in addition to or in place of the hardware already depicted. In addition, main memory 50 is connected to system bus 32, and includes a control program 51.

Although not specifically depicted in FIG. 1 and FIG. 2, computer system 20 may conform to "Plug and Play ISA Specification v. 1.0a," and "PCI Local Bus Specification 2.1," methodologies that allow devices to communicate resource needs to the computer system via hardware configuration registers. The present invention described herein thus takes advantage of ISA Plug and Play (PnP) and PCI architecture to improve the usability and compatibility of PnP devices. The PnP and PCI devices are configured by Plug and Play configuration software initialized via the system Power-On Self Test (POST). (POST is a set of routines stored in a computer's read-only memory (ROM) that tests various system components, such as RAM, the disk drives, and the keyboard to determine if such components are properly connected and operating normally. If problems are discovered related to such components, the POST routines alert the user by simply displaying a message, often accompanied by a diagnostic numeric value, to the standard output or standard error device (i.e., usually the screen). If the power-on self test is successful, it passes control back to the computer system.)

It is important to note that, while the present invention has been (and will continue to be) described in the context of a fully functional computer system, those skilled in the art will appreciate that the present invention is capable of being distributed as a program product in a variety of forms, and that the present invention applies equally regardless of the particular type of signal-bearing media utilized to actually carry out the distribution. Examples of signal-bearing media include: recordable-type media, such as floppy disks, hard disk drives, and CD ROMs, and transmission-type media such as digital and analog communication links. Examples of transmission media include devices such as modems. Modems are communication devices that enable computers such as computer 20 depicted in FIG. 1 and FIG. 2 to transmit information over standard telephone lines.

Figure 3A:
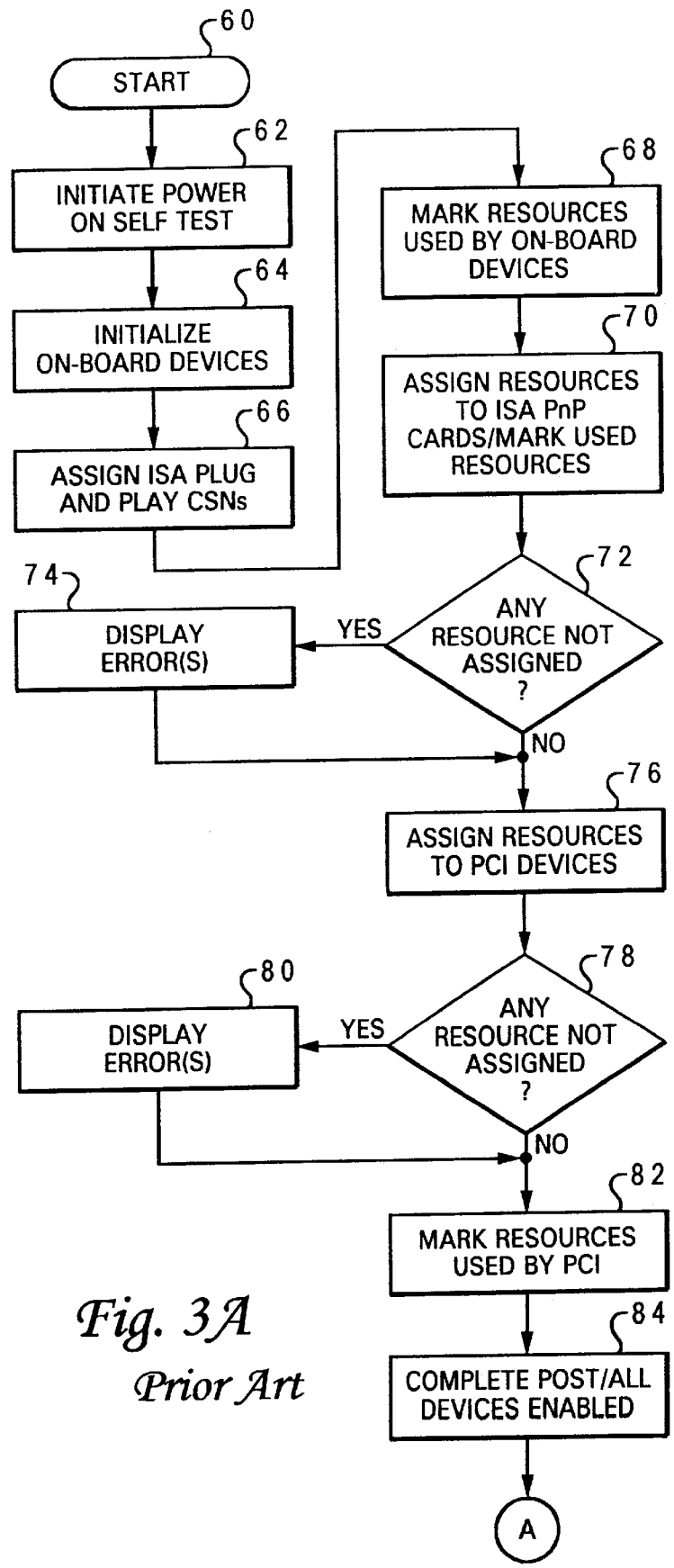
FIG. 3A illustrates a prior art high level logic flow diagram that depicts steps in the process utilized to carry out initialization a computer.
Figure 3B:
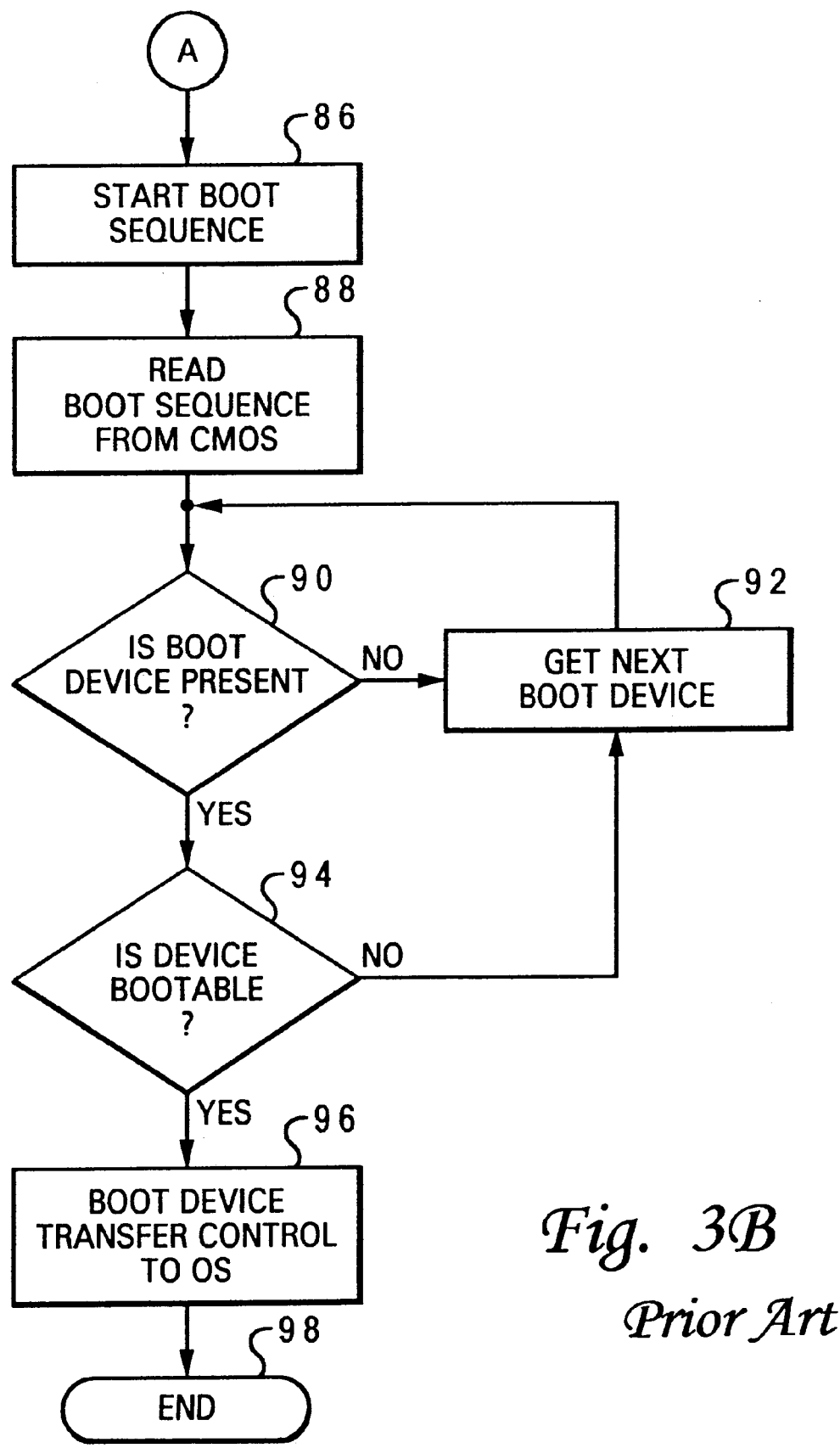
FIG. 3B is a continuation of the flow diagram shown in FIG. 3A.

FIGS. 3A and 3B illustrates a high level logic flow diagram that depicts prior art steps for a process utilized to carry out system initialization of Plug and Play (PnP) and PCI devices such as audio, video, pointing device, input, output, memory, and modem devices. It can be appreciated by those skilled in the art that FIGS. 3A and 3B presents a self-consistent sequence of steps leading to a desired result. The steps are those requiring physical manipulation of physical quantities. Usually, although not necessarily, these quantities take the form of electrical or magnetic signals capable of being stored, transferred, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as "initiating," "configuring," "storing," and so forth, which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include dataprocessing systems such as general purpose digital computers or other similar devices. In all cases the distinction between the method operations in operating a computer and the method of computation itself should be borne in mind. The present invention relates to method steps of operating a computer, such as computer system 20 depicted in FIG. 1 and FIG. 2, in processing electrical or other (e.g. mechanical, chemical) physical signals to generate other desired physical signals.

Thus as depicted in blocks 60 and 62, a prior art process is started by initiating a Power On Self Test (POST). As depicted thereafter at block 64 on-board devices are initialized as designated within the computer system (i.e., computer system 20 of FIG. 1 and FIG. 2). The card select numbers for the plug and play devices are assigned next as shown in block 66. A nominal selection of resources (e.g., resource data) is associated with the on-board or peripheral devices and is marked as shown in block 68. As depicted in block 70, resources are then assigned to ISA PnP cards and the used resources are marked.

If any resources are not assigned (because of a shortage of system resources or a conflict), then as illustrated at block 74, an error message is generated via the display to the end user requiring in most cases to have the end user access the utility set-up feature in the BIOS to reallocate resources. Normally POST displays an error if I/O, memory, interrupt, or DMA resources cannot be assigned to a PnP or PCI device. This is likely to occur if adapter cards have been added to the system, particularly with the limited interrupt resources (only 16 of them). After ISA PnP resources are assigned the process continues, as indicated thereafter at block 76 wherein resources required by the PCI devices are determined and assigned. If any resources are not assigned, then as illustrated at block 78, an error message is once again generated via the display to the end user requiring the end user to typically access the utility set-up feature in the BIOS. After PCI resources are assigned the process continues, as indicated thereafter at blocks 82 and 84 wherein the resources are marked, all devices are enabled and the POST operation is completed.

As depicted thereafter at block 86 and 88 and shown in FIG. 3B, the operating system boot process begins by reading the sequence from CMOS. Next, as illustrated at blocks 90, 92 and 94, after POST has completed and the BIOS boot sequence code takes control, the BIOS checks boot devices according to the boot sequence stored in CMOS until a bootable device is found. Thereafter, as indicated at block 94, a device is "booted" and transfer of control is given to the operating system. The process terminates thereafter, as described at block 98. The above-described prior art process is typical of starting up and initiating a computer system.

Figure 4A:
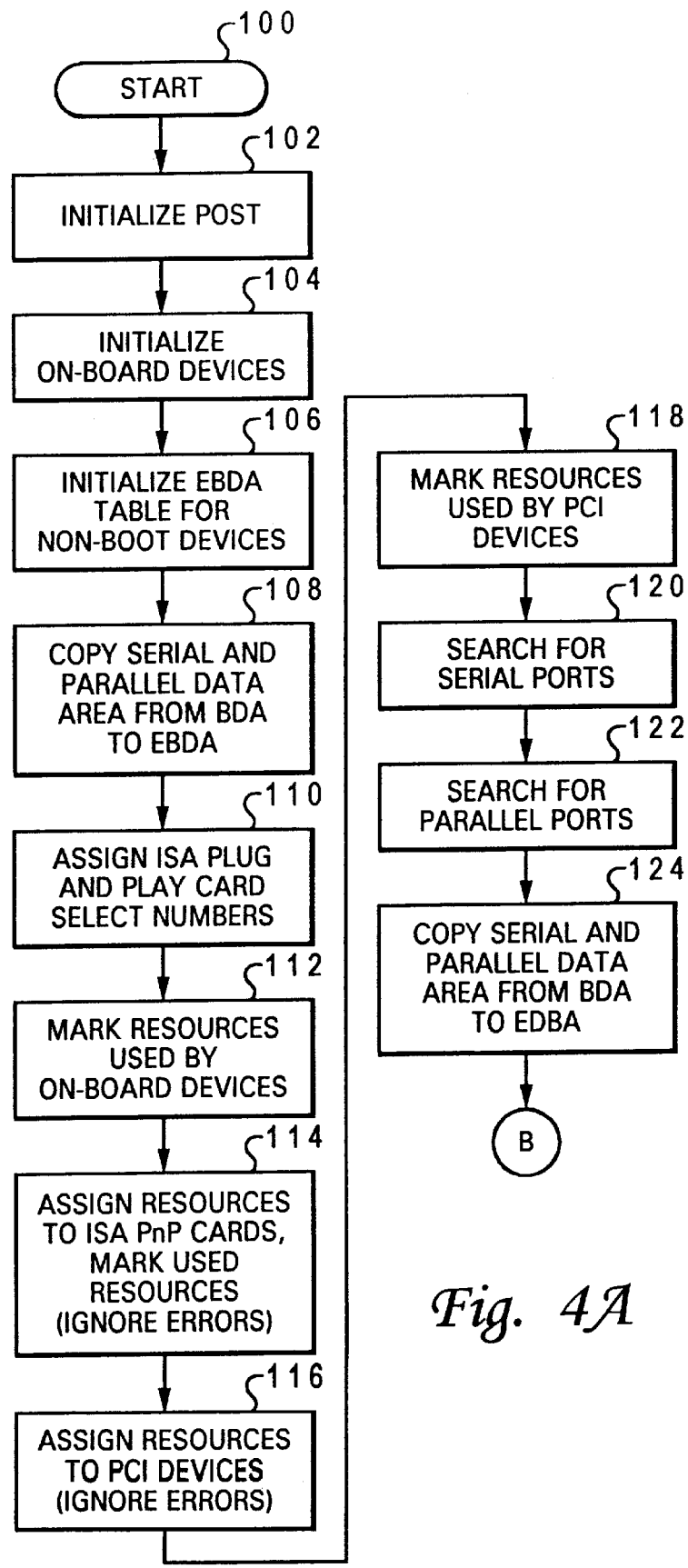
FIG. 4A illustrates a high level logic flow diagram that depicts steps in the process utilized to carry out initialization a computer with a plug and play operating system option in accordance with a preferred embodiment of the present invention.
Figure 4B:
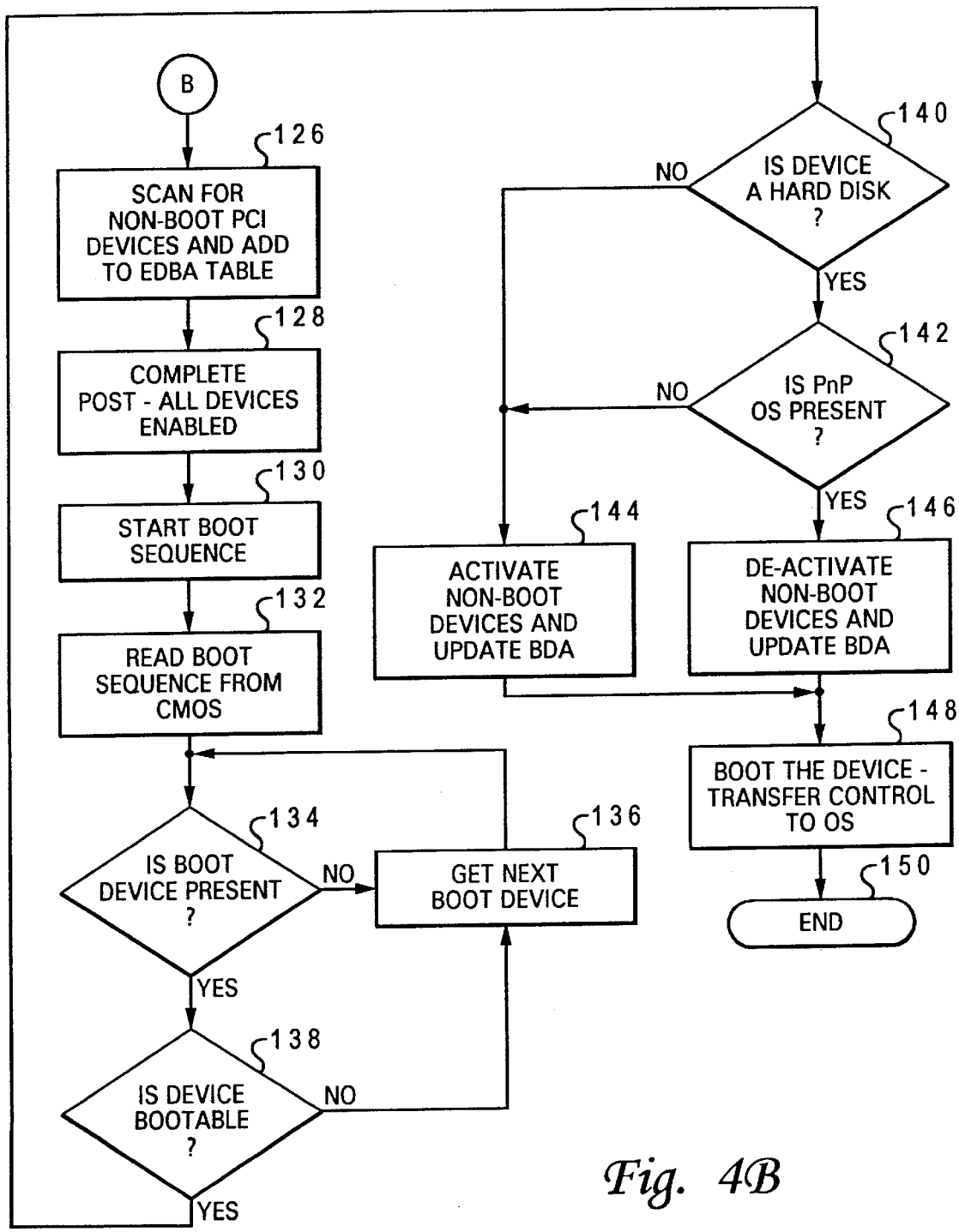
FIG. 4B is a continuation of the flow diagram shown in FIG. 4A in accordance with a preferred embodiment of the present invention.

Turning now to FIGS. 4A and 4B, there is illustrated a high level logic flow diagram that depicts steps for a process utilized to carry out the method and system for initialization of Plug and Play (PnP) and PCI devices in accordance with a preferred embodiment of the present invention. It can be appreciated by those skilled in the art that FIGS. 4A and 4B presents a self-consistent sequence of steps leading to a desired result. As depicted in blocks 100 and 102, the process in accordance with the present invention is started by initiating a Power On Self Test (POST). As depicted thereafter at block 104 an extended BIOS data area (EBDA) is initialized for non-boot devices within the computer system (i.e., computer system 20 of FIG. 1 and FIG. 2). Next, as depicted in block 108, the serial and parallel data area is copied from the BIOS data area (BDA) to the EBDA. The list of devices not necessary for booting is coded so that POST can step through it. It begins with a word (16 bits) signifying the start of PnP ISA devices. A specific value in the next word can signify the start of PCI devices as will be more fully described below. Otherwise as shown in block 110, it will contain and have assigned a Card Select Number (CSN) and logical device number of a PnP ISA device. During POST, ISA Plug and Play devices are classified based on the Memory Resource Descriptors. All ISA PnP devices without a ROM (such as audio and modem) are considered to be non-boot. This is because ISA PnP boot devices like video or SCSI adapters normally require their own BIOS ROM for initialization and run-time support.

Referring once again to FIG. 4A, a nominal selection of resources (e.g., resource data) are associated with the on-board or peripheral devices and are marked as shown in block 112. As depicted in block 114, resources are then assigned to ISA PnP cards and the used resources are marked. In accordance with a preferred embodiment of the present invention, the PnP operating system configures and manages all non-boot devices. As described above, when POST could not configure a PnP ISA or a PCI device, an error was displayed to the user. In accordance with the present invention, when the PnP operating system option is turned on, all POST errors referring to PnP and PCI configurations are suppressed. If the PnP operating system option is turned off, POST errors are not suppressed. When a POST error occurs and the end user goes into the Setup Utility, the PnP operating system option is flagged, suggesting that it be turned on, to allow the operating system option to handle the resource configuration that POST could not complete.

Referring once again to FIG. 4A, the PnP ISA portion of the list goes until the start of the PCI portion is identified. In accordance with a preferred embodiment of the present invention, an attempt is made such that all PCI devices will have an interrupt assigned to them. Because PCI devices are more flexible, the PCI configuration takes place only after the PnP ISA devices have been configured. If no free interrupt is found for a PCI device during IRQ configuration because all the interrupts were assigned to the motherboard and PnP ISA devices (which is the one type of device that must have an interrupt assigned during POST), the PnP device table in the EBDA is scanned for the first device with an IRQ assigned. The PnP device information is removed from the table, the registers for the PnP device are cleared to de-activate it preventing it from being activated or deactivated later in POST, and the IRQ information is marked and returned to the PCI IRQ configuration routine. The IRQ(s) that was (were) used by the device is (are) then available for the PCI device(s). The PCI configuration routine programs the PCI device and the PCI/ISA bridge configuration registers with the values necessary to assign the available IRQ to the PCI device, as depicted in blocks 116 and 118. One freed IRQ may be adequate for all PCI devices because of their ability to share interrupts. Next, as depicted through blocks 120, 122 and 124 the serial and parallel ports are searched and the serial and parallel data area is copied from the BIOS data area (BDA) to the EBDA.

Turning now to FIG. 4B, the PCI devices in the list are also identified by words, but the list contains the PCI Function Address (PFA) of each device. The PCI portion of the list continues until a specific value (indicating the end of the list) is found wherein non-boot PCI devices are added to the EBDA table as depicted in step 126 all devices are enabled and the POST operation is completed, shown in block 128. PCI devices are determined to be boot or non-boot based on the "class code" field in PCI configuration registers. For each PCI non-boot device, the PCI Function Address (PFA) is stored in a table in the EBDA. The EBDA table containing ISA PnP and PCI device information is created during POST and is accessible to the BIOS boot-up code until control of the system is transferred to the operating system via the boot process. As depicted thereafter at blocks 130 and 132 and shown in FIG. 4B, the operating system boot process begins by reading the boot sequence from CMOS. Next, as illustrated at blocks 134, 136 and 138, after POST has completed and the BIOS boot sequence code takes control, the BIOS checks boot devices according to the boot sequence stored in CMOS until a bootable device is found.

Thereafter, as indicated at block 140, if a bootable device is found, it is determined whether or not it is a hard disk. If the device is a hard disk, it is checked for the presence of a PnP operating system. Based on Microsoft's criteria of searching the boot sector for a signature of "'MSWIN 4.0", POST searches for a subset of the signature by reading the Master Boot Record (CHS 0, 1, 1.) If an "MSWI" signature at offset 3 is present, along with the level of '4' or higher at offset 8 in the signature, it is assumed that a PnP operating system is present. Additionally, the POST code may be designed in such a way that other checks may be easily added. If a hard disk with the PnP operating system is about to be booted, an ActivateNonBoot routine is called with an input parameter of 0 (to de-activate devices), depicted in block 146. However, if a hard disk without the PnP operating system signature or another type of device (like floppy or CD-ROM) is about to be booted, the ActivateNonBoot routine is called with an input parameter of 1 (to activate devices), depicted in block 144.

The ActivateNonBoot routine first sets the ISA PnP devices to the desired state by writing the value of the input parameter (0 or 1) to the activate register of each device in the EBDA table. The ActivateNonBoot routine then sets all PCI devices in the EBDA table to the desired state in the following manner: if the input parameter is 0 (to deactivate) the I/O Enable, Memory Enable, and Bus Master Enable bits of the Command Register for each PCI device are cleared. If the input parameter is 1 (to activate), the PCI device Base Registers are scanned to see whether I/O and/or Memory resources are used by the device; if so, the I/O Enable and/or Memory Enable bit of the Command Register is set accordingly. The ActivateNonBoot routine then sets the on-board PnP devices (like the serial port and parallel port) to the desired state by writing the value of the input parameter to the Activate Register of each device in the Super I/O controller. At this time the serial and parallel port addresses in the BIOS Data Area are updated according to the current configuration. Thereafter, as depicted in block 148, the device is "booted" and transfer of control is given to the operating system. The process terminates thereafter, as described at block 150 wherein the PnP operating system may fully configure all the PnP devices.

The embodiments and examples set forth herein are presented in order to best explain the present invention and its practical application and, thereby, to enable those skilled in the art to make and use the invention. However, those skilled in the art will recognize that the foregoing description and examples have been presented for the purposes of illustration and example only. For example, the method and system presented herein functions with all types of configuration routines, such as BIOS, OS, and so forth, and is not limited to operating in association with only one particular type of configuration routine. Additionally when the PnP operating system option is turned on, but booting actually happens from diskette, CD, etc. (non hard disk), all devices are configured to the best ability of POST. This feature leaves the system in the best possible condition for use with a non-PnP OS, where the end user may run a diagnostics program or may need a non-boot device, like the parallel port for printing. The description as set forth is not intended to be exhaustive or to limit the invention to the precise form disclosed. Many modifications and variations are possible in light of the above teaching without departing from the spirit and scope of the following claims.

What is claimed is:

1. A method for configuring plug and play (PnP) devices by a computer operating system, said method comprising the steps of:

initiating a power on self test within a computer system containing PnP and peripheral component interconnect (PCI) devices;

configuring said PnP and PCI devices within said computer system with associated interrupt requests (IRQs);

storing a list of said PnP and PCI devices which are non-bootable;

assigning IRQs to said non-bootable PCI devices;

booting said computer system from a media; and detecting a plug and play operating system for activating and deactivating said PnP devices and said PCI devices depending on a type of said media.

2. The method of claim 1 wherein the step of storing a list of said PnP and PCI devices further comprises the step of:

storing a card select number and logical device number for each said PnP non-boot device in an extended BIOS data area thereby creating a PnP device table.

3. The method of claim 1 wherein the step of storing a list of said PnP and PCI devices further comprises the steps of:

storing a PCI function address for each said PCI non-boot device in an extended BIOS data area thereby creating a PCI device table.

4. The method of claim 1 wherein the step of assigning IRQs for said PCI devices further comprises the step of:

suppressing power on self test errors from being displayed.

5. The method of claim 2 wherein the step of configuring IRQs for said PnP and PCI devices further comprises the steps of:

scanning said PnP device table for a first PnP device with an IRQ assigned if no free IRQ is found for a PCI device;

removing said IRQ for said PnP device; and assigning said IRQ to said PCI device.

6. The method of claim 1 wherein the step of detecting a plug and play operating system further comprises the step of:

activating said PnP and PCI devices if said type of media is not a hard disk.

7. The method of claim 1 wherein when said media is a hard disk the step of detecting a plug and play operating system further comprises the step of:

reading a master boot record.

8. The method of claim 7 wherein the step of reading master boot record comprises the step of:

checking for a "MSWI" signature at offset 3 of a sector along with a value of at least "4" at offset 8 in said master boot record.

9. The method of claim 7 wherein the step of detecting a plug and play operating system further comprising the step of:

responsive to detecting a "MSWI" signature, deactivating said PnP devices.

10. A system for configuring plug and play (PnP) devices by a computer operating system, comprising:

means for initiating a power on self test within a computer system containing PnP and peripheral component interconnect (PCI) devices;

means for configuring PnP and PCI devices within said computer system with associated interrupt requests (IRQs);

means for storing a list of said PnP and PCI devices which are non-bootable;

means for assigning IRQs to said non-bootable PCI devices;

means for booting said computer system from a media; and means for detecting a plug and play operating system for activating and deactivating said PnP devices and said PCI devices depending on a type of said media.

11. The system for configuring PnP devices according to claim 10 further comprising:

means for storing a card select number and logical device number for each said PnP non-boot device in an extended BIOS data area thereby creating a PnP device table.

12. The system for configuring PnP devices according to claim 10 further comprising:

means for storing a PCI function address for each said PCI non-boot device in an extended BIOS data area thereby creating a PCI device table.

13. The system for configuring PnP devices according to claim 10 further comprising:

means for suppressing power on self test errors from being displayed.

14. The system for configuring PnP devices according to claim 10 further comprising:

means for scanning said PnP device table for a first PnP device with an IRQ assigned if no free IRQ is found for a PCI device;

means for removing said IRQ for said PnP device; and means for assigning said IRQ to said PCI device.

15. The system for configuring PnP devices according to claim 10 further comprising:

means for activating said PnP and PCI devices if said type of media is not a hard disk.

16. The system for configuring PnP devices according to claim 10 further comprising:

means for reading a master boot record.

17. The system for configuring PnP devices according to claim 16 further comprising:

means for checking for a "MSWI" signature at offset 3 of a sector along with a value of at least "4" at offset 8 in said master boot record.

18. The system for configuring PnP devices according to claim 17 further comprising:

responsive to detecting a "MSWI" signature, deactivating said PnP devices.

19. The system for configuring PnP devices according to claim 18 further comprising:

configuring said PnP devices by said plug and play operating system.

20. A computer program product, on a computer readable medium, comprising:

a computer process code for configuring plug and play (PnP) and peripheral component interconnect (PCI) devices within a computer system and assigning associated interrupt request (IRQs) during a power on self test within a computer system;

wherein said computer process code stores a list of said PnP and PCI devices which are non-bootable;

wherein in response to assigning IRQs, all said non-bootable PCI devices are assigned an IRQ by transferring assigned said IRQs from said list of PnP devices by removing and deactivating said PnP devices;

wherein responsive to detecting a plug and play operating system, activating and deactivating said PnP devices and said PCI devices depending on a type of media used for booting.

* * * * *